US006803964B1

(12) United States Patent
Post et al.

(10) Patent No.: US 6,803,964 B1
(45) Date of Patent: Oct. 12, 2004

(54) METHOD AND APPARATUS FOR PROCESSING DIGITAL DATA

(75) Inventors: Lauren Lee Post, Pflugerville, TX (US); Michael Joseph Koval, Austin, TX (US); Darryl Ray Polk, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1388 days.

(21) Appl. No.: 08/822,319

(22) Filed: Mar. 21, 1997

(51) Int. Cl.$^7$ ............................................. H04N 7/12
(52) U.S. Cl. ............................... 348/423.1; 375/240.23
(58) Field of Search ................... 348/423.1, 511–515, 348/555, 845.2, 845.3, 497; 386/96–106, 68, 81, 82, 98, 95; 360/75, 20; 370/412; 375/240.01, 240.12, 240.13, 240.22, 240.23; H04N 7/12

(56) References Cited

U.S. PATENT DOCUMENTS

| | | | |
|---|---|---|---|
| 5,257,144 A | | 10/1993 | Curasi et al. .................. 360/51 |
| 5,309,290 A | * | 5/1994 | Sugiyama et al. ............. 360/32 |
| 5,351,090 A | | 9/1994 | Najamura .................... 348/484 |
| 5,377,051 A | * | 12/1994 | Lane et al. ................. 360/33.1 |
| 5,452,006 A | * | 9/1995 | Auld ........................... 348/390 |
| 5,453,790 A | | 9/1995 | Vermeulen et al. .......... 348/410 |
| 5,537,408 A | | 7/1996 | Branstad et al. ............... 370/79 |
| 5,576,902 A | | 11/1996 | Lane et al. .................... 386/68 |
| 5,583,561 A | | 12/1996 | Baker et al. .................... 348/7 |
| 5,583,650 A | | 12/1996 | Lane et al. .................... 386/81 |
| 5,583,652 A | * | 12/1996 | Ware ............................ 386/75 |
| 5,586,264 A | | 12/1996 | Belknap et al. .............. 395/200 |
| 5,594,660 A | * | 1/1997 | Sung et al. .................. 364/514 |
| 5,629,740 A | * | 5/1997 | Tanaka et al. ............... 348/515 |
| 5,644,446 A | * | 7/1997 | Tasi et al. ................... 360/72.2 |
| 5,652,627 A | * | 7/1997 | Allen .......................... 348/497 |
| 5,664,044 A | * | 9/1997 | Ware ............................ 386/75 |
| 5,668,601 A | * | 9/1997 | Okada et al. ................ 348/423 |
| 5,686,965 A | * | 11/1997 | Auld ........................... 348/423 |
| 5,715,176 A | * | 2/1998 | Mobini .................... 364/541 R |
| 5,784,119 A | * | 7/1998 | Noda et al. ................. 348/512 |
| 5,809,454 A | * | 9/1998 | Okada et al. ............... 704/214 |
| 5,930,450 A | * | 7/1999 | Fujita ........................... 386/95 |
| 5,930,451 A | * | 7/1999 | Ejiri ............................. 386/98 |
| 5,946,318 A | * | 8/1999 | Post ........................... 370/412 |

OTHER PUBLICATIONS

Information technology—Coding of moving pictures and associated audio for digital storage media at up to about 1,5 Mbit/s—Part 1: Systems; ISO/IEC 1993; Reference No. ISO/IEC 11172–1:1993(B).

Information technology—Coding of moving pictures and associated audio for digital storage media at up to about 1,5 Mbit/s—Part 2: Video; ISO/IEC 1993; Reference No. ISO/IEC 11172–2:1993(B).

Information technology—Coding of moving pictures and associated audio for digital storage media at up to about 1,5 Mbit/s—Part 3: Audio; ISO/IEC 1993; Reference No. ISO/IEC 11172–3:1993(E).

OpenMPEG Multiplatform API Specification Version 1.03; OpenMPEG Consortium, Mountain View, CA; Revision Date: May 9, 1996.

(List continued on next page.)

Primary Examiner—Gims Philippe
Assistant Examiner—Tung Vo
(74) Attorney, Agent, or Firm—Duke W. Yee; Jeffrey S. LaBaw; Stephen R. Tkacs

(57) ABSTRACT

A method and apparatus for synchronizing a data stream that contains video data in which the video data includes frames. As frames are being processed, a number of frames processed is identified along with a number of frames dropped during processing. A synchronization speed is identified using the number of frames processed and the number of frames dropped. A frame is selectively dropped from the data stream based on the synchronization speed.

39 Claims, 10 Drawing Sheets

| DROPPED FRAME % | SYNC METHODS | VIDEO FRAME DEPENDENCIES FOR SLOW VIDEO | 300 AUDIO DEPENDENCIES |
|---|---|---|---|
| 65 - 100% | Slow | Drop all frames if video is slow | Drop if decoded audio data is < 3 audio buffers |
| 35 - 66% | Medium | Drop only P and B frames For I frames, decode but set flags on to drop the next P or B frames until the next I frame can be decoded | Drop if decoded audio data is < 2 audio buffers |
| 0 - 35% | Fast | Drop only B frames For I and P frames, decode but set flags on to drop the next B frames until another P or I frame is decoded | Drop if decoded audio data is < 1 audio buffer |

OTHER PUBLICATIONS

Information Technology—Generic Coding of Moving Pictures and Associated Audio: Systems, Recommendation H.222.0; International Organisation for Standardisation Organisation Internationale De Normalisation ISO/IEC JTC1/SC29/WG11; Coding of Moving Pictures and Associated Audio; N0801 rev; Apr. 21, 1995.

Information Technology—Generic Coding of Moving Pictures and Associated Audio Information: Video, Recommendation ITU.T H.262; International Organisation for Standardisation Organisation Internationale De Normalisation ISO/IEC JTC1/SC29/WG11; Coding of Moving Picturesd and Associated Audio; N0802 ISO/IEC 13818–2rev, Draft of Nov. 9, 1994.

* cited by examiner

| FRAME | 200 FUNCTION |
|---|---|
| I | Predict future P and B frames<br>Dropped I frames must drop future P and B frames until another I frame. |
| P | Predict future P and B frames<br>Dropped P frames must drop future P and B frames until another I frame. |
| B | Predict past and future B frames<br>Dropped B frames must drop future B frames until another P frame. |

*Fig. 2*

| DROPPED FRAME % | SYNC METHODS | VIDEO FRAME DEPENDENCIES FOR SLOW VIDEO | 300 AUDIO DEPENDENCIES |
|---|---|---|---|
| 65 - 100% | Slow | Drop all frames if video is slow | Drop if decoded audio data is < 3 audio buffers |
| 35 - 66% | Medium | Drop only P and B frames For I frames, decode but set flags on to drop the next P or B frames until the next I frame can be decoded | Drop if decoded audio data is < 2 audio buffers |
| 0 - 35% | Fast | Drop only B frames For I and P frames, decode but set flags on to drop the next B frames until another P or I frame is decoded | Drop if decoded audio data is < 1 audio buffer |

*Fig. 3*

IBBPBBBPBBIBBPBBBPB...

METHOD AND APPARATUS FOR PROCESSING DIGITAL DATA

BACKGROUND OF THE INVENTION

1. Technical Field

The present invention relates generally to an improved data processing system and in particular to a method and apparatus for processing a digital data stream. Still more particularly, the present invention relates to a method and apparatus for synchronizing audio and video data in a digital data stream.

2. Description of the Related Art

Multimedia, the presentation or transfer of information through more than one medium at any time, is a fast growing segment of the computer industry with many applications being developed, which incorporate various features of multimedia. Additionally, many businesses are using multimedia to present information to consumers. Multimedia combines different forms of media in the communication of information to a user through a data processing system, such as a personal computer. A multimedia application is an application that uses different forms of communications within a single application. For example, multimedia applications may communicate data to a user through a computer via audio and video simultaneously. Such multimedia applications are usually bit intensive, real time, and very demanding, requiring ample processing power in the data processing system. Users may access in the multimedia, for example, in the form of video games or movies on a digital video disk (DVD) or through a communications link.

Multimedia presentations often require synchronization of audio and video data within a multimedia data stream. In digital audio/video systems, audio and video decoders require timing information. Where the audio and video streams are compressed, the decoder decompresses them and clocks each frame out to the next stage for playback using the timing information. If the streams are uncompressed, the decoders simply use the timing information to control audio and video buffers and send the frames to the next stage at the appropriate rate. In any case, the decoders in a data processing system must maintain synchronization between the audio and video to insure a user perceives a synchronized audio/video presentation.

One well-known standard for synchronized recording and playback and compressed digital audio and video data streams is the MPEG (Motion Picture Experts Group) standard.

Video compression and encoding is typically performed by a video encoder. The video encoder normally implements a selected data compression algorithm that conforms to a recognized standard or specification agreed to among the senders and receivers of digital video signals. One such emerging standard developed by the Moving Pictures Experts Group, is generally referred to as the MPEG International Standard ISO for MPEG-1. The MPEG-1 standard defines a format for compressed digital video which supports data rates of about 1 to 1.8 Mbps (Megabits per second), resolutions of about 352 pixels (picture elements) horizontally to about 228 lines vertically, picture rates of about 24 to 30 pictures per second.

In order for a video signal to be compressed in MPEG-1, it is typically sampled, digitized, and represented by luminance and color difference signals. The MPEG standard signal is sampled with respect to color difference signals by a ratio of two-to-one (2:1). That is, for every two samples of the Y component, there is to be one sub-sample each of the Cr and Cb components. It has been determined that the 2:1 sampling ratio is appropriate because the human eye is much more sensitive to luminance (brightness) components (y) than to color components (Cr, Cb). Video sampling takes place in both the vertical and horizontal directions.

Once the video signal is sampled, it is reformatted, for example, into a non-interlaced signal. An interlaced signal is one that contains only part of the picture content (i.e. every other horizontal line) for each complete display scan. A non-interlaced signal, in contrast, is one that contains all of the picture content. After the video signal is sampled and reformatted, the encoder may process it further by converting it to a different resolution in accordance with the image area to be displayed. In doing so, the encoder must determine which type of picture is to be encoded. A picture may be considered as corresponding to a single frame of motion video, or to a frame of movie film. However, different types of picture types may be employed for digital video transmission. The picture types for MPEG video are: I-Pictures (Intra-Coded Pictures) which are coded without reference to any other pictures and are often referred to as anchor frames; P-Pictures (Predictive-Coded Pictures) which are coded using motion-compensated prediction from the past I or P reference picture, and may also be considered anchor frames; and B Pictures (Bi-directionally Predictive-Coded Pictures) which are coded using motion compensation from a previous and a future I or P Picture.

A typical coding scheme may employ a mixture of I, P, and B Pictures. Typically, an I Picture may occur every half a second, with two B Pictures inserted between each pair of I or P pictures. I Pictures provide random access points within the coded sequence of pictures where decoding can begin, and are coded with only a moderate degree of compression. P Pictures are coded more efficiently using motion compensated prediction from a past I or P Picture and are generally used as a reference for further prediction. B Pictures provide the highest degree of compression but require both past and future reference pictures for motion compensation. B Pictures are generally not used as references for prediction. The organization of the three picture types in a particular video sequence is very flexible.

MPEG video decoding is the inverse of MPEG video encoding and is employed to reconstruct a motion picture sequence from a compressed, encoded bitstream. The data in the bitstream is decoded according to the syntax defined in the data compression standard. The decoder must first identify the beginning of a coded picture, identify the type of picture, then decode each individual macroblock within a particular picture. If there are motion vectors and macroblock types (each of the picture types I, P, and B have their own macroblock types) present in the bitstream, they can be used to construct a prediction of the current macroblock based on past and future reference pictures that the decoder has already stored. Coefficient data is then inverse quantized and operated on by an inverse discrete cosine transform (IDCT) process that transforms the macroblock data from the frequency domain to the space domain.

Once all the macroblocks have been processed by the decoder, the picture reconstruction is complete. If the picture just reconstructed is a reference picture (I Picture), it replaces the oldest stored reference picture and is used as the new reference for subsequent pictures. As noted above the pictures may also need to be re-ordered before they are displayed in accordance with their display order instead of their coding order. After the pictures are re-ordered, they may be displayed on an appropriate output device.

For software MPEG playback, MPEG data contains presentation time stamps (PTS) which are meant to be used for synchronization. However, with software playback both audio and video data after decompression sometimes lose the exact position of the PTS. As a result, the PTS values cannot be accurately used for synchronization in some cases. Additionally, because MPEG frames consist of I, P, and B frames, how the video frames are dropped for synchronization is a determinant of video quality on playback.

Therefore, it would be advantageous to have an improved method for synchronizing audio and visual data without requiring the use of time stamps.

SUMMARY OF THE INVENTION

It is one objective of the present invention to provide an improved data processing system.

It is another objective of the present invention to provide a improved method and apparatus for processing a digital data stream.

It is yet another objective of the present invention to provide a method and apparatus for synchronizing audio and video data in a digital data stream.

The foregoing objectives are achieved as follows.

The present invention provides a method and apparatus for synchronizing a data stream that contains video and audio data in which the video data includes frames. As frames are being processed, a number of frames processed is identified along with a number of frames dropped during processing. A synchronization speed is identified using the number of frames processed and the number of frames dropped. A frame is selectively dropped from the data stream based on the synchronization speed.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 2 is a table illustrating different frame types in an MPEG data stream;

FIG. 3 is a table of different synchronization processes according to the present invention;

FIG. 4 is a diagram of a data stream including I, P, and B frames;

DETAILED DESCRIPTION OF THE PREFERRED EMBODIMENT

Figure 1A:
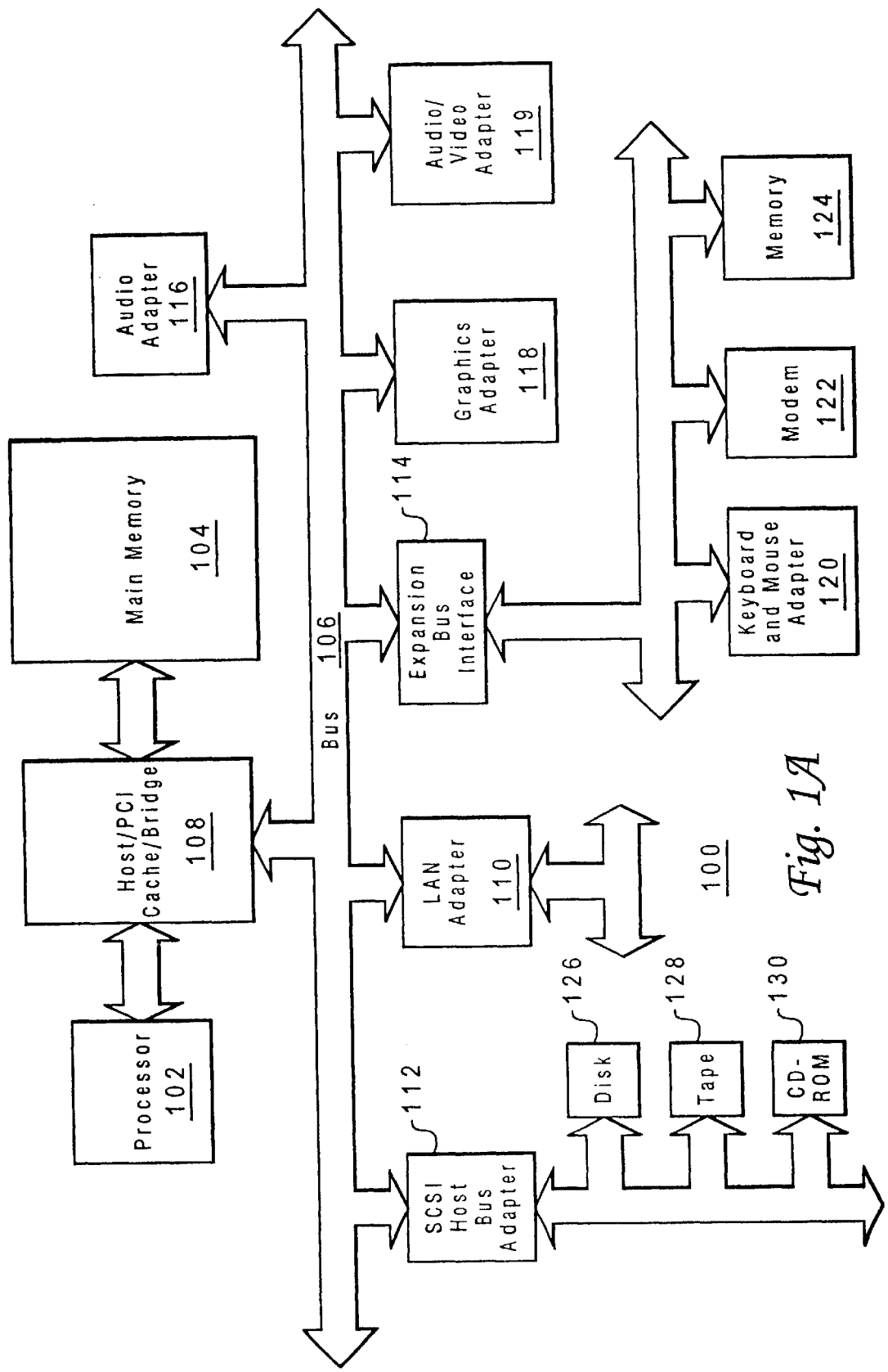
FIG. 1A is a block diagram of a data processing system in which the present invention may be implemented.

With reference now to the figures, and in particular with reference to FIG. 1A, a block diagram of a data processing system 100 in which the present invention may be implemented is illustrated. Data processing system 100 employs a peripheral component interconnect (PCI) local bus architecture. Other bus architectures such as ISA and Micro Channel may be employed. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, SCSI host bus adapter 112, and expansion bus interface 114 are connected to PCI local bus 106 by direct component connection. In contrast, audio adapter 116, graphics adapter 118, and audio/video adapter (A/V) 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CD-ROM 130 in the depicted example.

Typical PCI local bus implementations will support three or four PCI expansion slots or add-in connectors. The depicted example includes four loads on the mother board and three expansion slots. Those of ordinary skill in the art will appreciate that the hardware in FIG. 1A may vary. For example, other perencial devices, such as optical disk drives and the light may be used in addition to or in place of the hardware depicted in FIG. 1A. The depicted example is not meant to imply architectural limitations with respect to the present invention.

Figure 1B:
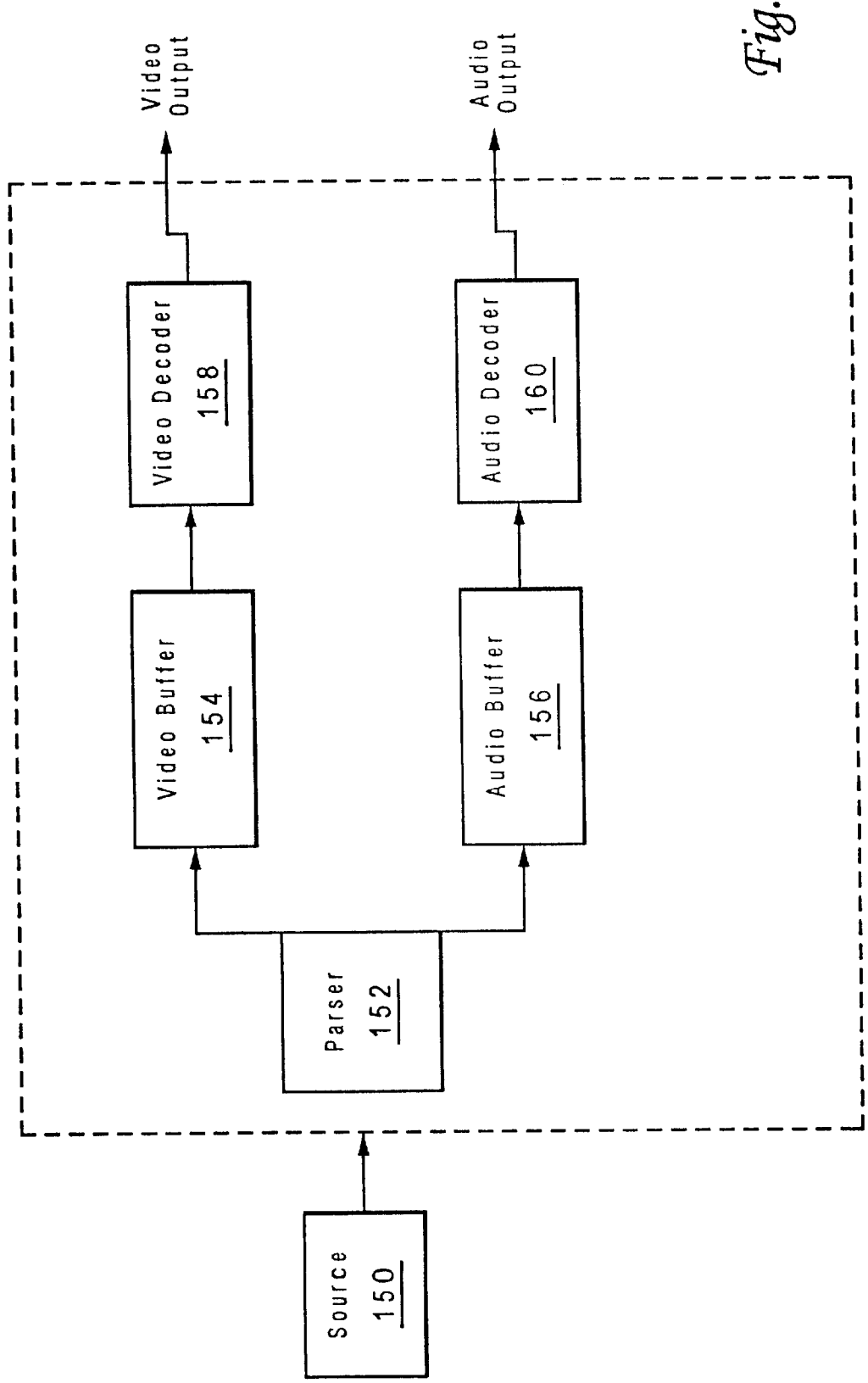
FIG. 1B is a block diagram of an audio/video adapter in which the present invention may be implemented.

In FIG. 1B, a block diagram of a audio/video adapter is depicted from FIG. 1A according to the present invention. A/V adapter 119 has an input connected to source 150 which may be a digital storage media, such as hard disk 126 or CD-ROM 130. Alternatively, source 150 may be a data stream from a remote source received through LAN adapter 110. Parser 152 separates video data from audio data with video data being sent to video buffer 154 and audio data being sent to audio buffer 156. Video decoder 158 is employed to synchronize and decode or drop video frames to produce a video output. Audio decoder 160 is employed to decode audio to create an audio output for the multimedia presentation. The decoding performed by A/V adapter 119 may be implemented using the MPEG standard. In the depicted example, the processes of the present invention are implemented within A/V adapter 119. The processes for synchronizing and dropping video may be employed within video decoder 158 in FIG. 1A or in a separate synchronizer block (not shown) placed between video buffer 154 and video decoder 158.

For software MPEG playback, various synchronization methods may be employed in A/V adapter 119 to slow or speed up the video to synchronize it with an audio stream. Various synchronization methods are described below for dropping video frames. Dropping video frames is easier than dropping audio data because a viewer viewing a multimedia presentation is less likely to notice a periodic dropping of frames in contrast to audio data. Additionally, these processes may be dynamically changed during playback based on factors described below.

According to the present invention, the different synchronization methods used are specified as slow, medium, and fast. The three categories of speed are relative to the speed of the apparatus processing the data stream. The synchronization methods may be dynamically changed during the processing of a data stream to account for changes in processing resources. For example, a data processing system may be processing three MPEG data streams at the same time and at a later period process only one data stream, which would result in the speed of the data processing system to increase. Additionally, a "fast" data processing system may receive a data stream from a slow source, such as across a network. Although the depicted example shows three categories of speed for the synchronization methods other numbers of categories may be employed. The switch between different synchronization methods provides scaleability on given configurations. As more processing bandwidth is consumed or released, the synchronization methods can adjust to perform better on either slow or fast configurations.

The present invention provides an ability to avoid using presentation time stamps, which comes from counting I frames and predicting when the next I frame will occur if the current I frame is decoded. In this manner, the present invention takes advantage of determining whether the decoding process will be ahead or behind based on when a prediction of how long it will take to decode the current frame.

The slow synchronization method drops selected ones of all types of MPEG frames (I,P,B). The medium synchronization method drops only P and B frames, and the fast synchronization method drops only B frames. Based on the estimation of future decoded frames and the current time, if the percentage of dropped frames is in a range from about zero percent to about thirty-five percent, then the synchronization method uses the fast synchronization method. For a difference of thirty-five percent to sixty-five percent, a medium synchronization method is employed. Finally, for a difference from sixty-five percent to one hundred percent, a slow synchronization method is employed. The calculation to determine whether video is behind is done by estimation using the following factors of frame rate, I frame counter and the current time. The current time is queried by the system timer and an average frame time is added to create an adjusted current time. The estimated decode time is calculated before decoding any time of frame by using the frame rate and the number of frames equal to the I frame counter. The adjusted current time and estimated decode time are compared to see if the adjusted current time is greater in which the video decode time is behind.

Additionally, for data streams containing both audio and video, video frames are dropped based on the amount of decoded audio data that is ready and the synchronization method. For the slow synchronization method, decoded audio data for three audio buffers should typically be available or a video frame is dropped. For a medium synchronization method, the decoded data for two audio buffers should be available or the next appropriate P or B video frame is dropped. For the fast synchronization method, the decoded data only for one audio buffer need be available or the next appropriate B frame is dropped. The depicted example is used with MPEG encoded content. The number of audio buffers a solution is using is relevant to this part of the invention. This solution in the depicted example works best with 8 buffers of size 6K when using software decoded audio. If the number of buffers being used is reduced and the size increased then this part of the invention is not employed.

With reference now to FIG. 2, a table 200 illustrating different frame types in MPEG and the dependencies are depicted according to the present invention. In table 200, I frames are employed to predict future P and B frames. As can be seen in table 200, dropped I frames result in the dropping of the future P and future B frames until another I frame occurs. P frames are employed to predict future P and B frames. Dropped P frames result in the dropping of future P and B frames until another I frame occurs. B frames are employed to predict past and future B frames. Dropped B frames result in the dropping of future B frames until another P frame occurs.

Time differentials for determining whether the video data is slow or fast is the difference between the estimation of the current time plus an average frame time and the estimated time for the next decoded frame based on the frame counts. For dynamically determining the correct synchronization process, frame counters are employed. For each frame whether decoded or dropped, a cumulative frame counter is incremented. As each frame is dropped, a frame counter is incremented. For each I frame after a certain delay time into the stream, the cumulative frame counter total and dropped frame counter dropped are compared to see if the dropped frame percentage is less than thirty-five percent in which the fast process is employed. For thirty-five to sixty-five percent, a medium process is employed and for sixty-five to one hundred percent, the slow process is employed.

With reference to FIG. 3, a table of different synchronization processes are depicted according to the present invention. Table 300 shows dropped frame percentages and their correspondence to different synchronization methods. For each of the synchronization methods, video frame dependencies are listed for slow video. Additionally, table 300 also includes audio dependencies.

For fast video, the video is slowed down by using time differentials to sleep the video thread based on either the time differential or the average frame time, using whichever is smaller. In FIG. 4, a diagram illustrating a sequences of frames in a data stream 400. The decoded frames are I, P, and B frames processed by the present invention. Twelve frames from I to I are present for MPEG-1 and MPEG-2 data streams in the United States and Japan.

Figure 5:
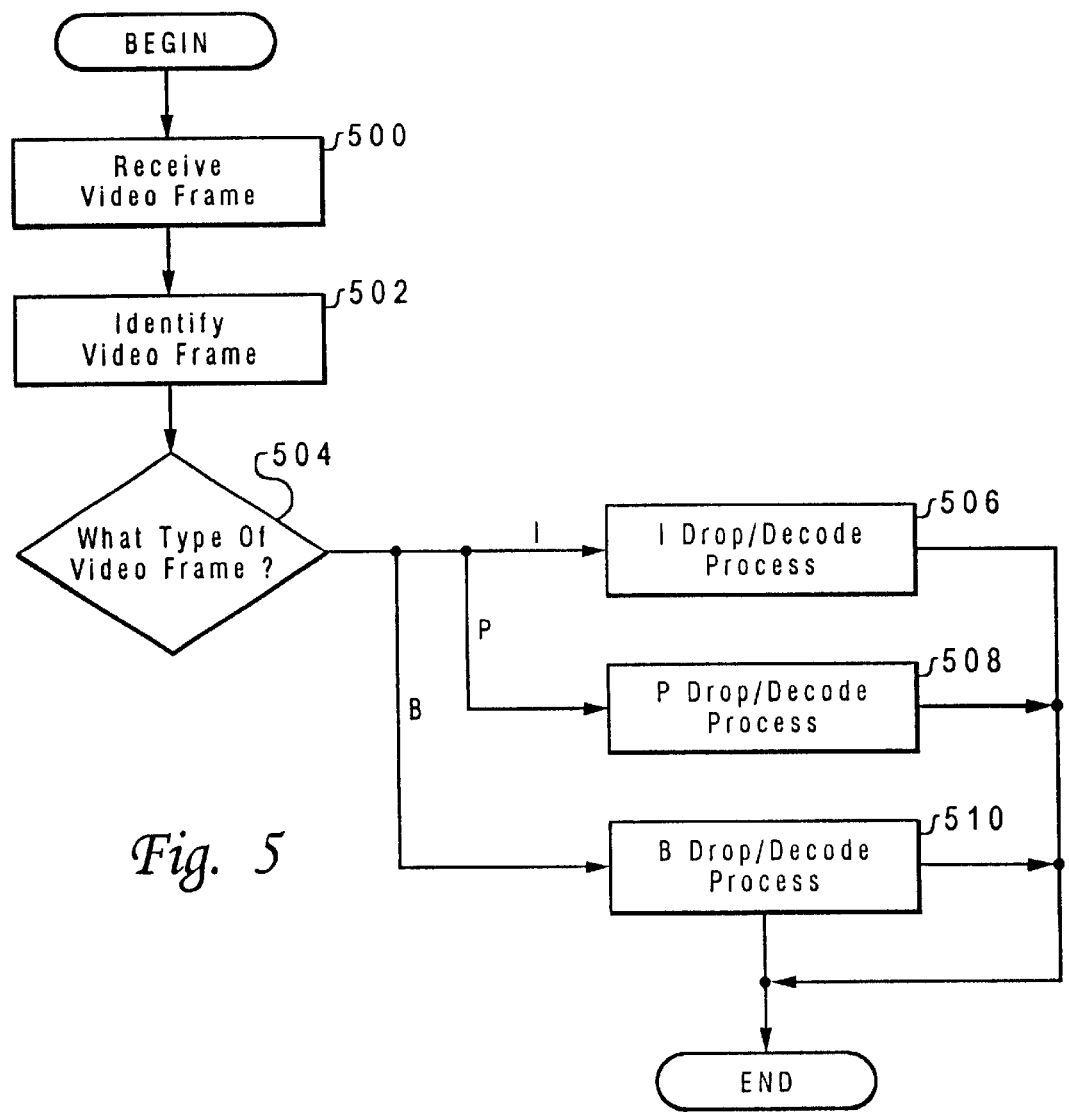
FIG. 5 is a flowchart of a process for a dynamically identifying processes for dropping/decoding frames according to the present invention.

With reference now to FIG. 5, a flowchart of a process for dynamically identifying processes for dropping/decoding frames is depicted according to the present invention. The process begins by receiving a video frame (step 500). Next, the video frame is identified (step 502). A determination is then made as to whether the video frame is a I, P, or B frame (step 504). If the video frame is an I frame, the I drop-decode process is selected (step 506) with the process terminating thereafter. If the video frame is identified as a P frame, the process then selects the P drop/decode process (508). Otherwise, the B drop/decode process is selected (step 510) with the process terminating thereafter.

Figure 6:
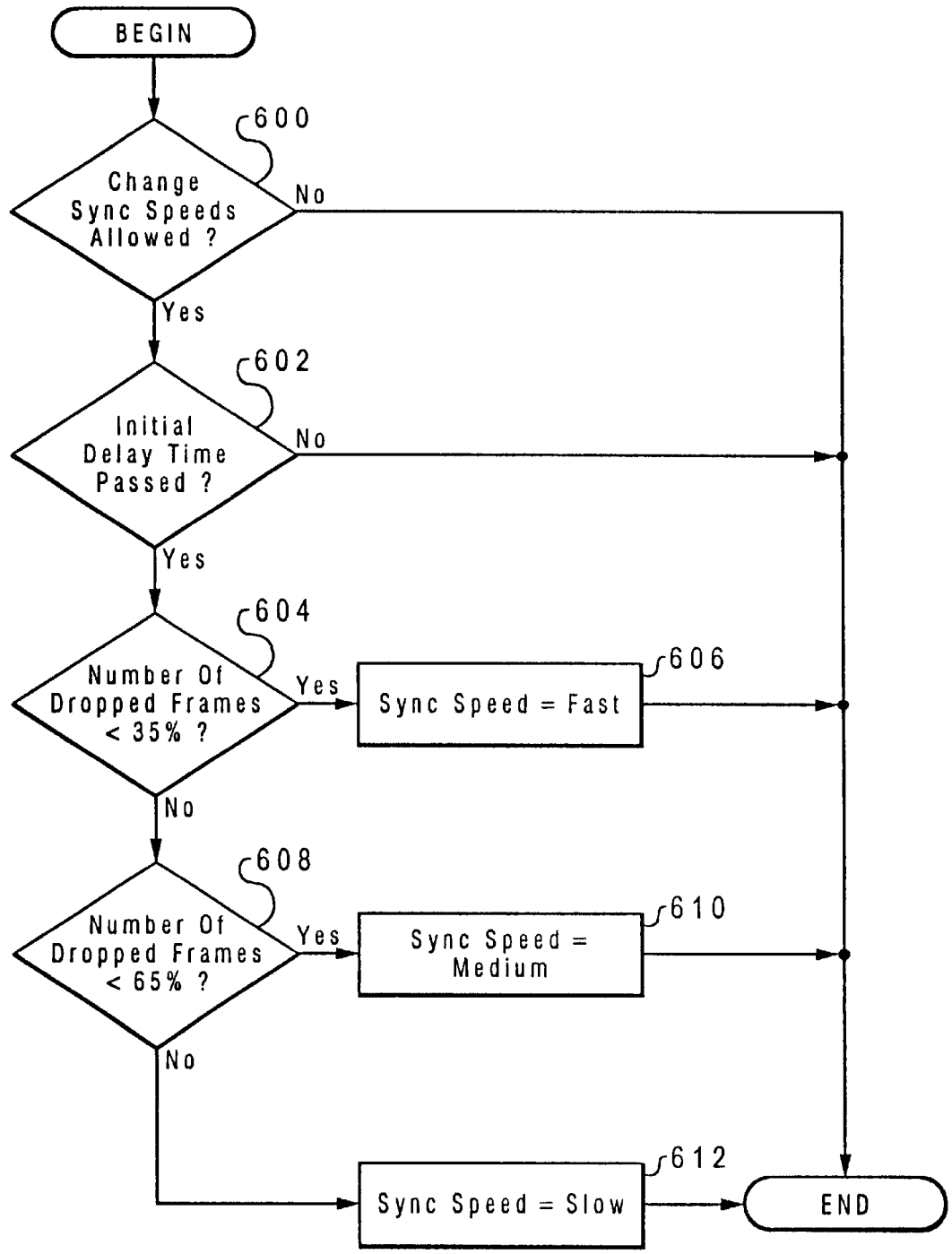
FIG. 6 is a flowchart of a process for determining a new synchronization speed according to the present invention.

With reference now to FIG. 6, a flowchart of a process for determining a new synchronization speed is depicted according to the present invention. This process is performed when processing I frames in the depicted example. A determination of a new synchronization speed could be performed for processing of other frame types depending on the implementation and processing resources available.

The process begins by determining whether changes in synchronization speeds are allowed (step 600). In some applications, a change in synchronization speed is not allowed. In this case, the multimedia presentation may suffer in quality. If a change in synchronization speed is not allowed, the process terminates. Otherwise, a determination is made as to whether the initial delay time has passed (step 602). If the initial delay time has not passed, the process also terminates.

Upon the passing of the initial delay time, the process then determines whether the dropped frame percentage is less than thirty-five percent (step 604). If the number of dropped frames is less than thirty-five percent, then the synchronization speed is labeled as being fast (step 606) with the process terminating thereafter. If the number of dropped frames is not less than thirty-five percent, then a determination is made as to whether the number of dropped frames is less than sixty-five percent (step 608). If the number of dropped frames is less than sixty-five percent, the process then labels the synchronization speed as medium (step 610) with the process terminating thereafter. Otherwise, the synchronization speed is labeled as slow (step 612) with the process terminating thereafter.

Figure 7:
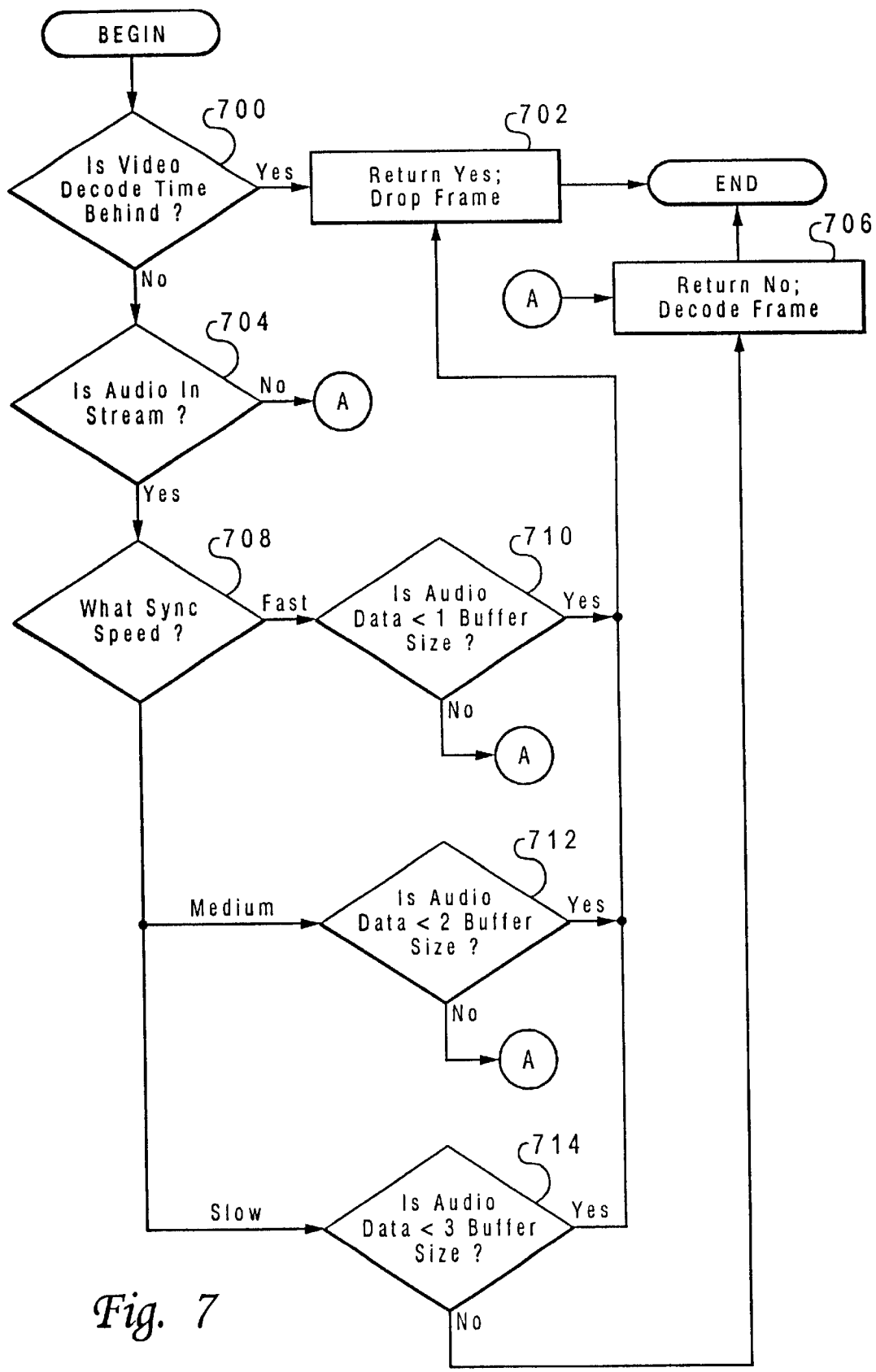
FIG. 7 is a flowchart of a process for determining whether to drop a frame according to the present invention.

With reference to FIG. 7, a flowchart of a process for determining whether to drop a frame is depicted according to the present invention. The process begins by determining whether the video decode time is "behind" (step 700). If the video decode time is behind, the process then returns a yes to the application and drops a frame (step 702) with the process terminating thereafter. If the video decode time is not behind, the process then determines whether audio is present in the data stream (step 704). If audio is not present in the data stream, the process then returns a note to the application and decodes the frame (step 706) with the process terminating thereafter. With reference again to step 704, if audio is in the data stream, the process then determines what synchronization speed has been set for the process (step 708).

If the synchronization speed is fast, a determination is then made as to whether the decoded audio data takes up less than one audio buffer (step 710). If the audio data takes up less than one buffer, the process then returns a yes to the application and drops the frame (step 702). Otherwise, the process proceeds to step 706 and the video frame is decoded.

If the synchronization speed is medium, a determination is then made as to whether the decoded audio data is less than two buffers in size (step 712). If the audio data is less than two buffers in size, the process proceeds to step 702. Otherwise, the process proceeds to step 706 to decode the video frame.

With reference again to step 708, if the synchronization speed is slow, the process then determines whether the decoded audio data is less than three buffers in size (step 714). If the audio data is less than three buffers in size, the process proceeds to step 702 to drop the video frame. Otherwise, the process proceeds to step 706 to decode the video frame. In the depicted example, the process employs eight 6K audio buffers.

Figure 8:
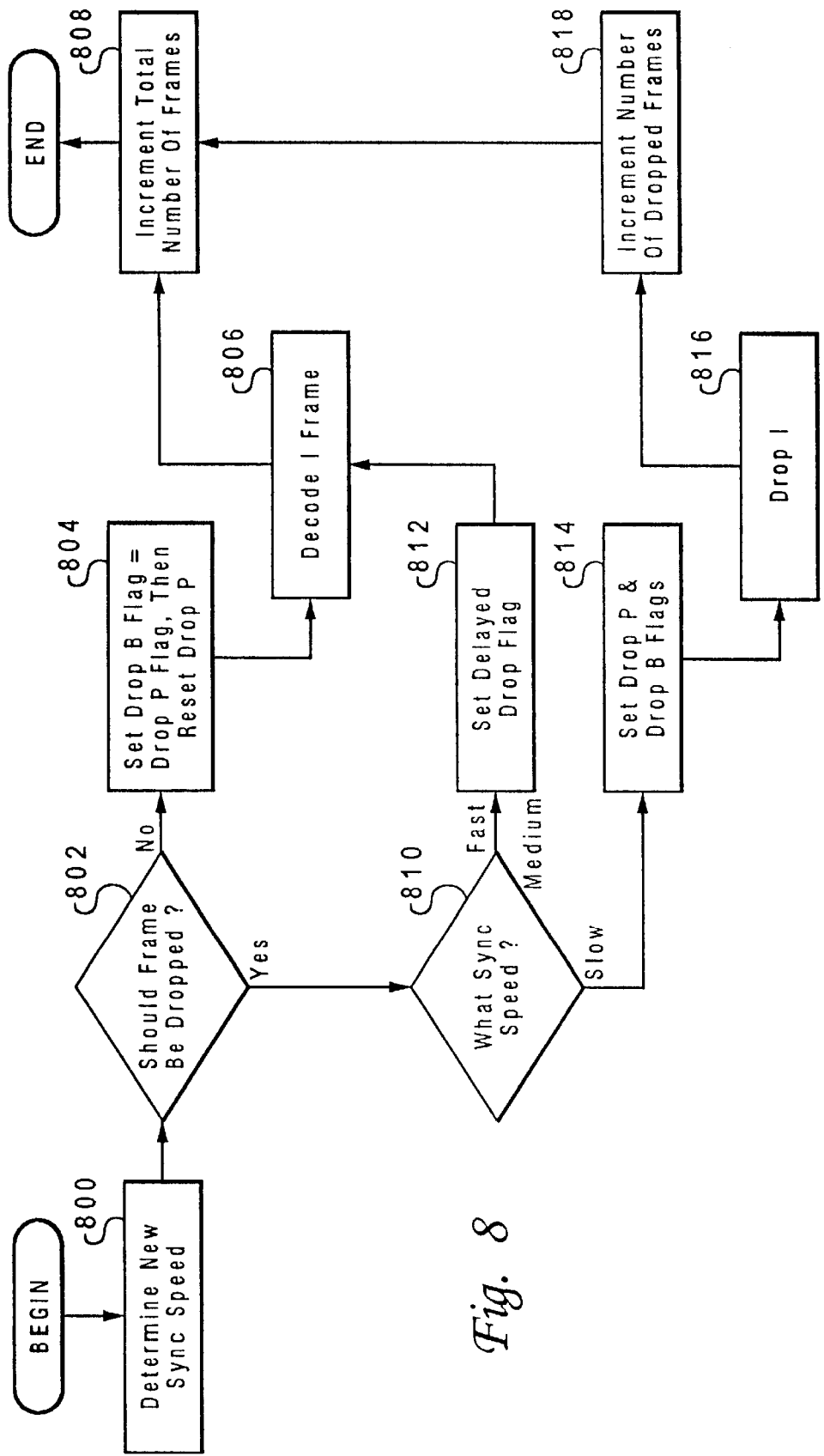
FIG. 8 is a flowchart of a process for dropping or decoding I frames according to the present invention.

With reference now to FIG. 8, a flowchart of a process for dropping or decoding I frames is depicted according to the present invention. The process begins by determining a new synchronization speed (step 800). This step is described in more detail above in FIG. 6. Thereafter, a determination is made as to whether the frame should be dropped (step 802). If the frame is not to be dropped, the drop B flag is set to the drop P flag before it is reset (step 804). Then, the I frame is decoded (step 806) and the variable total is incremented to indicate the total number of frames decoded (step 808).

With reference again to step 802, if the frame is to be dropped, the process then identifies the synchronization speed (step 810). If the synchronization speed is fast or medium, the process then sets delayed drop flag (step 812) with the process then proceeding to step 806 as described above. With reference again to step 810, if the synchronization speed is slow, then the drop P and drop B are set (step 814). Thereafter, the I frame is dropped (step 816) and the variable DROPPED is incremented to identify the total number of dropped frames (step 818) with the process then proceeding to step 808 as previously described.

Figure 9:
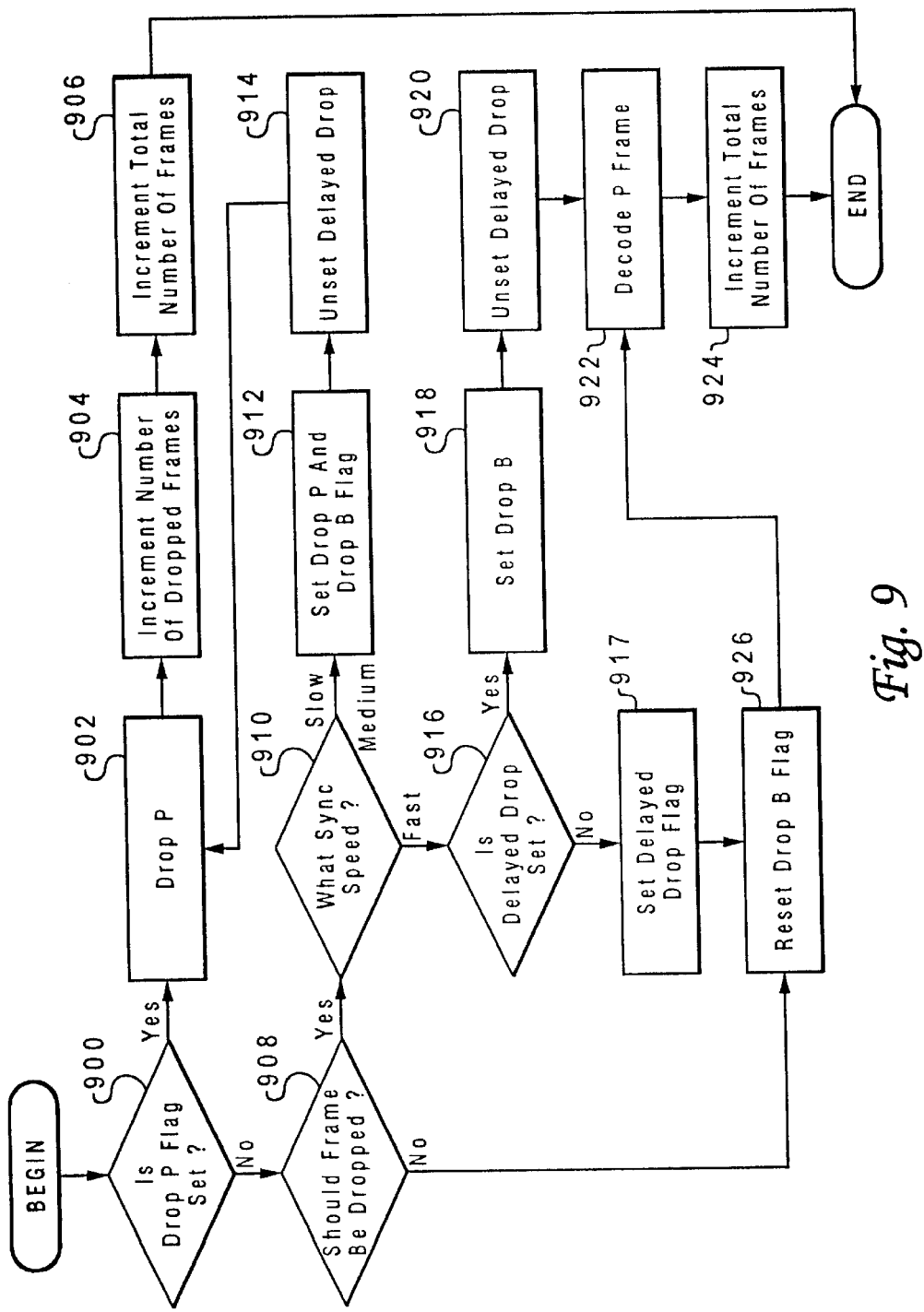
FIG. 9 is a flowchart of a process for dropping or decoding P frames according to the present invention.

With reference now to FIG. 9, a flowchart of a process for dropping or decoding P frames is depicted according to the present invention. The process begins by determining whether the drop P flag has been set (step 900). If the drop P flag has been set, the process then drops the P frame (step 902) and then increments the variable DROPPED to identify the total number of dropped frames (step 904). Thereafter, the variable TOTAL is incremented to identify the total number of frames processed (step 906) with the process terminating thereafter.

With reference again to step 900, if the drop P flag is not set, a determination is made as to whether the P frame should be dropped (step 908). If the P frame is be dropped, the synchronization speed is then identified (step 910). If the synchronization speed is slow or medium, then the drop P and the drop B flags are set (step 912). Thereafter, the delayed drop flag is unset (step 914) with the process then proceeding to step 902 as described above.

With reference again to step 910, if the synchronization speed is fast, then a determination is made as to whether the delayed dropped flag has been set (step 916). If the delayed dropped flag has been set, the process then sets the delayed dropped flag (step 917) with the process then setting the drop B flag (step 918). Thereafter, the delayed drop flag is unset (step 920). After unsetting the delayed dropped flag, the process then decodes the P frame (step 922), and then increments the variable TOTAL (step 924) with the process terminating thereafter.

With reference again to step 916, if the delayed dropped flag is not set, the process proceeds to step 922. With reference again to step 908, if the frame should not be dropped, the process then proceeds to reset the drop B flag (step 926) with the process then proceeding to step 922 as previously described.

Figure 10:
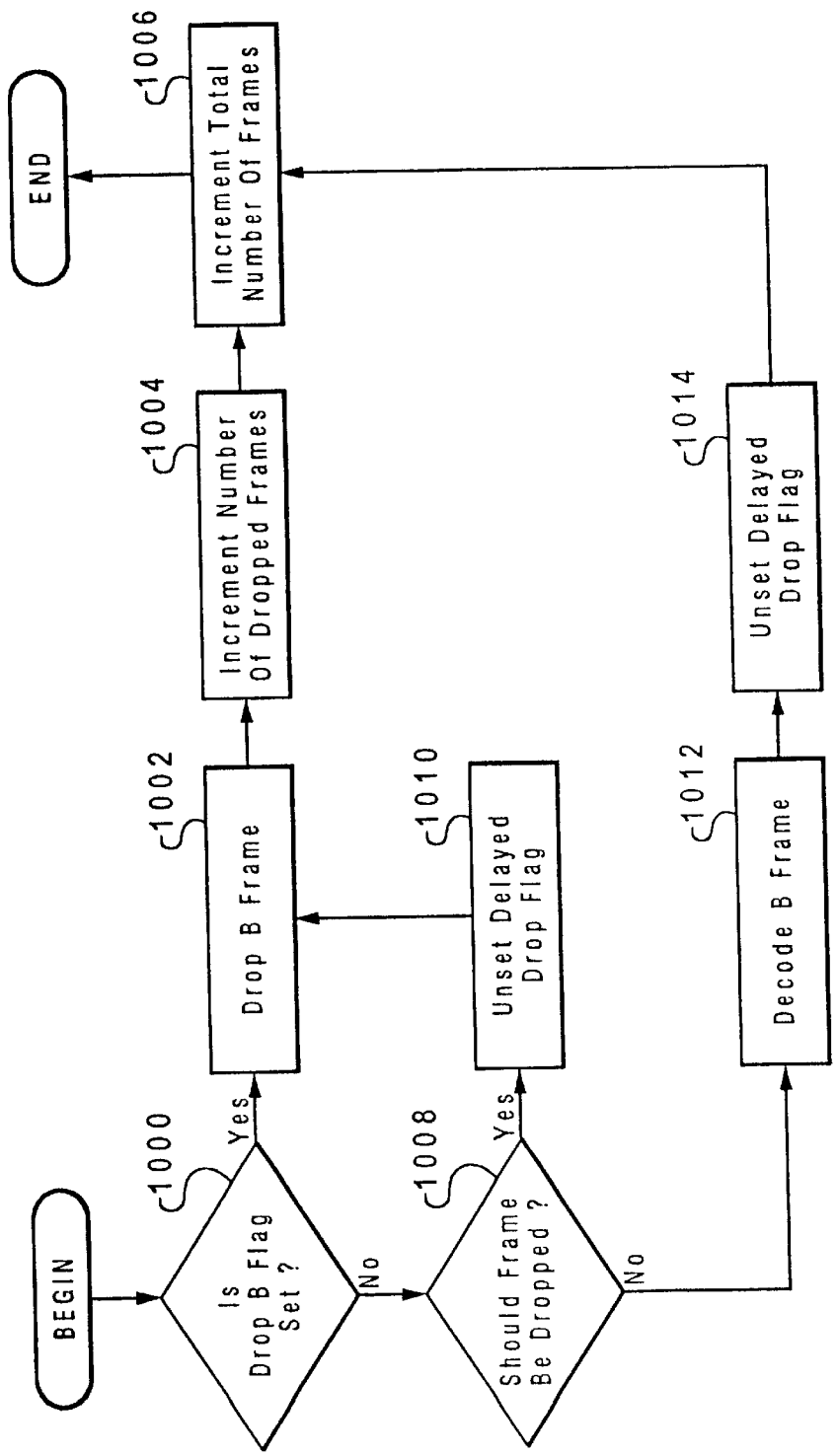
FIG. 10 is a flowchart of a process for dropping or decoding B frames according to the present invention.

With reference now to FIG. 10, a flowchart of a process for dropping or decoding B frames is depicted according to the present invention. The process begins by determining whether the drop B flag has been set (step 1000), if the drop B flag has been set, the process then drops the B frame (step 1002). Thereafter, the variable DROPPED is incremented to identify the total number of dropped frames (step 1004). The process then increments the variable TOTAL to identify the total number of frames processed (step 1006) with the process terminating thereafter.

With reference again to step 1000, if the drop B flag is not set, a determination is made as to whether the B frame should be dropped (step 1008). If the B frame should be dropped, then the delayed drop flag is unset (step 1010) with the process then proceeding to step 1002 as previously described. If the B frame is not to be dropped, the process then decodes the B frame (step 1012). Next, the delayed drop flag is unset (step 1014) with the process then proceeding to step 1006.

Thus, the present invention provides an improvement in an apparatus for synchronizing audio and video data. The present invention may be implemented in different types of MPEG data streams. For example, the processes of the present invention may be implemented in an MPEG-1 data stream defined under ISO/IEC 11172 from the International Organization for Standardization and the International Electronics Commission. MPEG-2 data streams also may be processed by the present invention and are defined under ISO/IEC 13818. The present invention provides an advantage over presently available systems in processing MPEG data streams because the use of presentation time stamps (PTSs) for synchronization are avoided along with the errors that may occur in the position of PTSs through decompression. The present invention provides this advantage by dropping frames based on frame types. Frame counters are employed to determine a correct synchronization method and then each frame that is decoded or dropped a cumulative frame counter total is incremented to identify the number of processed frames. Additionally, as frames are dropped, a dropped frame counter is incremented. Thereafter, the cumulative frame counter and the dropped frame counter are used to determine the dropped frame percentage of total frames to identify a synchronization method. From the synchronization methods, frames are dropped based on various frame dependencies.

Thus, the present invention provides a process for processing MPEG data streams and software with high quality video using a scalable solution across different speed configurations. The present invention avoids having to tune or calibrate each system. The present invention provides an ability to avoid using presentation time stamps, which comes from counting I frames and predicting when the next I frame will occur if the current I frame is decoded. In this manner, the present invention takes advantage of determining whether the decoding process will be ahead or behind based on when a prediction of how long it will take to decode the current frame.

Additionally, the present invention reduces the amount of audio breakup by using audio data buffering dependency that is scaled to the particular synchronization method. Thus, better audio quality is provided.

It is important to note that while the present invention has been described in the context of a fully functional data processing system and an adapter, those skilled in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include, for example, recordable type media such as floppy disks and CD-ROMs and transmission type media such as digital and analogue communications links. Additionally, the present invention may be embodied in computer readable media such as a read only memory. Additionally, the present invention may be implemented in hardware depending on the use.

The description of the preferred embodiment of the present invention has been presented for purposes of illustration and description, but is not limited to be exhaustive or limited to the invention in the form disclosed. Many modifications and variations will be apparent to those of ordinary skill in the art. That the embodiment was chosen and described in order to best explain the principles of the invention the practical application to enable others of ordinary skill in the art to understand the invention for various embodiments with various modifications as are suited to the particular use contemplated.

What is claimed is:

1. A method in a data processing system for synchronizing audio data and video data in a data stream, wherein the video data includes a plurality of frames associated with a plurality of frames types, the method comprising:

identifying a synchronization process for the data stream using the plurality of frames and the associated plurality frame types, wherein the synchronization process is identified based on a speed of the apparatus, within the data processing system, processing the data stream; and selectively decoding the plurality of frames using the identified synchronization process.

2. A method in a data processing system for synchronizing video data in a data stream including video data wherein the video data includes a plurality of frames identified by a plurality of frame types in which each frame within the plurality of frames is associated with a frame type from the plurality of frames, the method comprising:

identifying a synchronization speed using the plurality of frames associated with the plurality of frame types; and selectively decoding the plurality of frames based on the identified synchronization speed and the plurality of frame types.

3. The method of claim 2, wherein the data stream includes audio data and wherein the step of selectively decoding the plurality of frames based on the identified synchronization speed and based on an amount of decoded audio data.

4. The method of claim 2, wherein the identifying step comprises identifying, for each of the plurality of frames, a synchronization speed using decoded frames from the plurality of frames and frame types of the decoded frames.

5. The method of claim 2, wherein the data stream is an MPEG data stream.

6. A method in a data processing system for synchronizing video data in a data stream, wherein the data stream is an MPEG data stream, including video data, wherein the video data includes a plurality of frames identified by a plurality of frame types in which each frame within the plurality of frames is associated with a frame type from the plurality of frames, the method comprising:

identifying a synchronization speed using the plurality of frames associated with the plurality of frame types;

selectively decoding the plurality of frames based on the identified synchronization speed; and wherein the plurality of fame types include B frames, I frames, and P frames and wherein the step of selectively decoding the plurality of frames based on the identified synchronization speed comprises dropping all frames if the synchronization speed is slow.

7. A method in a data processing system for synchronizing video data in a data stream, wherein the data stream is an MPEG data stream, including video data, wherein the video data includes a plurality of frames identified by a plurality of frame types in which each frame within the plurality of frames is associated with a frame type from the plurality of frames, the method comprising:

identifying a synchronization speed using the plurality of frames associated with the plurality of frame types;

selectively decoding the plurality of frames based on the identified synchronization speed, wherein the plurality of fame types include B frames, I frames, and P frames and wherein the step of selectively decoding the plurality of frames based on the identified synchronization speed comprises dropping all frames if the synchronization speed is slow; and wherein the synchronization speed is slow if a percentage of dropped frames is equal to or greater than sixty-five percent.

8. A method in a data processing system for synchronizing video data in a data stream, wherein the data stream is an MPEG data stream, including video data, wherein the video data includes a plurality of frames identified by a plurality of frame types in which each frame within the plurality of frames is associated with a frame type from the plurality of frames, the method comprising:

identifying a synchronization speed using the plurality of frames associated with the plurality of frame types;

selectively decoding the plurality of frames based on the identified synchronization speed; and wherein the plurality of frame types include B frames, I frames, and P frames and wherein the step of selectively decoding the plurality of frames based on the identified synchronization speed comprises dropping only P frames and B frames if the synchronization speed is medium.

9. A method in a data processing system for synchronizing video data in a data stream, wherein the data stream is an MPEG data stream, including video data, wherein the video data includes a plurality of frames identified by a plurality of frame type in which each frame within the plurality of frames is associated with a frame type from the plurality of frames, the method comprising:

identifying a synchronization speed using the plurality of frames associated with the plurality of frame types;

selectively decoding the plurality of frames based on the identified synchronization speed;

wherein the plurality of frame type, include B frames, I frames, and P frames and wherein the step of selectively decoding the plurality of frames based on the identified synchronization speed comprises dropping only P frames and B frames if the synchronization speed is medium; and wherein the synchronization speed is medium if the percentage of dropped frames is in a range from thirty-five percent to sixty-five percent.

10. A method in a data processing system for synchronizing video data in a data stream, wherein the data stream is an MPEG data stream, including video data, wherein the video data includes a plurality of frames identified by a plurality of frame types in which each frame within the plurality of frames is associated with a frame type from the plurality of frames, the method comprising:

identifying a synchronization speed using the plurality of frames associated with the plurality of frame types;

selectively decoding the plurality of frames based on the identified synchronization speed; and wherein the plurality of frame types include B frames, I frames, and P frames and wherein the step of selectively decoding the plurality of frames based on the identified synchronization speed comprises dropping only graphical object B frames if the synchronization speed is fast.

11. A method in a data processing system for synchronizing video data in a data stream, wherein the data stream is an MPEG data stream, including video data, wherein the video data includes a plurality of frames identified by a plurality of frame types in which each frame within the plurality of frames is associated with a frame type from the plurality of frames, the method comprising:

identifying a synchronization speed using the plurality of frames associated with the plurality of frame types;

selectively decoding the plurality of frames based on the identified synchronization speed, wherein the plurality of frame types include B frames, I frames, and P frames and wherein the step of selectively decoding the plurality of frames based on the identified synchronization speed comprises dropping only graphical object B frames if the synchronization speed is fast; and wherein the synchronization speed is fast if the percentage of dropped frames is in a range from zero percent to thirty-five percent.

12. A method for synchronizing a data stream including data, wherein the video data includes a plurality of frames having a plurality of frame types, the method comprising:

processing frames from the plurality of frames;

determining a number of frames processed;

determining a number of frames dropped during processing;

identifying a synchronization speed using the number of frames processed and the number of frames dropped; and selectively dropping a frame in the data stream based on the synchronization speed and a frame type associated with the frame.

13. The method of claim 12, wherein the step of determining a number of frames, the step of determining a number of frames dropped, and the step of identifying its synchronization speed are performed for each frame within the video stream.

14. A method for synchronizing a data stream including video data, wherein the video data includes a plurality of frames, the method comprising:

processing frames from the plurality of frames; determining a number of frames processed;

determining a number of frames dropped during processing; identifying a synchronization speed using the number of frames processed and the number of frames dropped;

selectively dropping a frame in the data stream based on the synchronization speed; and wherein the plurality of video frames includes I frames, B frames, and P frames, and wherein the step of selectively dropping frames comprises dropping all frames.

15. A method for synchronizing a data stream including video data, wherein the video data includes a plurality of frames, the method comprising:

processing frames from the plurality of frames; determining a number of frames processed;

determining a number of frames dropped during processing; identifying a synchronization speed using the number of frames processed and the number of frames dropped;

selectively dropping a frame in the data stream based on the synchronization speed; and wherein the plurality of frames includes I frames, B frames, and P frames, and wherein the step of selectively dropping frames comprises dropping only B frames and P frames.

16. A method for synchronizing a data stream including video data, wherein the video data includes a plurality of frames, the method comprising:

processing frames from the plurality of frames; determining a number of frames processed;
determining a number of frames dropped during processing; identifying a synchronization speed using the number of frames processed and the number of frames dropped;
selectively dropping a frame in the data stream based on the synchronization speed; and
wherein the plurality of frames includes I frames, B frames, and P frames, and wherein the step of selectively dropping frames comprises dropping only B frames.

17. The method of claim 12, wherein the step of selectively dropping frames in the data stream based on the synchronization speed further includes dropping frames based on a presence of audio data.

18. A data processing system for synchronizing audio data and video data in a data stream, wherein the video data includes a plurality of frames associated with a plurality of frame types, the data processing system comprising:
identification means for identifying a synchronization process for the data stream using the plurality of frames and the associated plurality of frame types, wherein the synchronization process is identified based on a speed of the apparatus, within the data processing system, processing the data stream; and
decoding means for selectively decoding the plurality of frames using the identified synchronization process.

19. The data processing system of claim 18, wherein the decoding means also selectively decodes frames based on an amount of decoded audio data.

20. An apparatus for synchronizing audio data and video data in a data stream, the apparatus comprising:
reception means for receiving the data stream, wherein the video data in the data stream includes a plurality of frames identified by plurality of frame types in which each frame within the plurality of frames is associated with a frame type from the plurality of frames;
identification means for identifying a synchronization speed using the plurality of frames associated with the plurality frame types; and
decoding means for selectively decoding the plurality of frames based on the identified synchronization speed and the plurality of frame types.

21. The apparatus of claim 20, wherein the decoding means further comprises selectively decoding the plurality of frames based on an amount of decoded audio data.

22. The apparatus of claim 20, wherein the identification means comprises means for identifying, for each of the plurality of frames, a synchronization speed using the decoded frames from the plurality of frames and frame types of the decoded frames.

23. The apparatus of claim 20, wherein the apparatus is a data processing system.

24. The apparatus of claim 20, wherein the apparatus is an audio/visual adapter.

25. An apparatus for synchronizing audio data and video data in a data stream, the apparatus comprising:
reception means for receiving the data stream, wherein the video data in the data stream includes a plurality of frames identified by plurality of frame types in which each frame within the plurality of frames is associated with a frame type from the plurality of frames; identification means for identifying a synchronization speed using the plurality of frames associated with the plurality frame types;
decoding means for selectively decoding the plurality of frames based on the identified synchronization speed; and
wherein the plurality of frame types includes B frames, I frames, and P frames and wherein the decoding means drops all frames if the synchronization speed is slow.

26. An apparatus for synchronizing audio data and video data in a data stream, the apparatus comprising:
reception means for receiving the data stream, wherein the video data in the data stream includes a plurality of frames identified by plurality of frame types in which each frame within the plurality of frames is associated with a frame type from the plurality of frames; identification means for identifying a synchronization speed using the plurality of frames associated with the plurality frame types;
decoding means for selectively decoding the plurality of frames based on the identified synchronization speed;
wherein the plurality of frame types includes B frames, I frames, and P frames and wherein the decoding means drops all frames if the synchronization speed is slow; and
wherein the synchronization speed is slow if a percentage of dropped frames is equal to or greater than sixty-five percent.

27. An apparatus for synchronizing audio data and video data in a data stream, the apparatus comprising:
reception means for receiving the data stream, wherein the video data in the data stream includes a plurality of frames identified by plurality of frame types in which each frame within the plurality of frames is associated with a frame type from the plurality of frames; identification means for identifying a synchronization speed using the plurality of frames associated with the plurality frame types;
decoding means for selectively decoding the plurality of frames based on the identified synchronization speed; and
wherein the plurality of frame types include B frames, I frames, and P frames and wherein the decoding means drops only P frames and B frames if the synchronization speed is medium.

28. An apparatus for synchronizing audio data and video data in a data stream, the apparatus comprising:
reception means for receiving the data stream, wherein the video data in the data stream includes a plurality of frames identified by plurality of frame types in which each frame within the plurality of frames is associated with a frame type from the plurality of frames; identification means for identifying a synchronization speed using the plurality of frames associated with the plurality frame types;
decoding means for selectively decoding the plurality of frames based on the identified synchronization speed;
wherein the plurality of Same types include B frames, I frames, and P frames and wherein the decoding means drops only P frames and B frames if the synchronization speed is medium; and
wherein the synchronization speed is medium if the percentage of dropped frames is in a range from thirty-five percent to sixty-five percent.

29. An apparatus for synchronizing audio data and video data in a data stream, the apparatus comprising:
reception means for receiving the data stream, wherein the video data in the data stream includes a plurality of frames identified by plurality of frame types in which each if frame within the plurality of frames is associated with a frame type from the plurality of frames; identification means for identifying a synchronization speed using the plurality of frames associated with the plurality frame types;

decoding means for selectively decoding the plurality of frames based on the identified synchronization speed; and wherein the plurality of frame types includes B frames, frames, and P frames and wherein the decoding means drops only B frames if the synchronization speed is fast.

30. An apparatus for synchronizing audio data and video data in a data stream, the apparatus comprising:

reception means for receiving the data stream, wherein the video data in the data stream includes a plurality of frames identified by plurality of frame types in which each frame within the plurality of frames is associated with a frame type from the plurality of frames; identification means for identifying a synchronization speed using the plurality of frames associated with the plurality frame types;

decoding means for selectively decoding the plurality of frames based on the identified synchronization speed;

wherein the plurality of frame types includes B frames, I frames, and P frames and wherein the decoding means drops only B frames if the synchronization speed is fast; and wherein the synchronization speed is fast if the percentage of dropped frames is in a range from zero percent to thirty-five percent.

31. An apparatus for processing video data in a data stream, the apparatus comprising:

receiving means for receiving the data stream, wherein the video data in the data stream includes a plurality of frames having a plurality of frame types;

processing means for processing frames from the plurality of frames;

first determination means for determining a number of frames processed;

second determination means for determining a number of frames dropped during processing;

identification means for identifying a synchronization speed suing the number of frames processed and the number of frames dropped; and dropping means for selectively dropping a frame in the data stream based on the synchronization speed and a frame type associated with the frame.

32. The apparatus of claim 31, wherein the first determination means, the second determination means, and the identification means are responsive to each frame processed within the video stream.

33. An apparatus for processing video data in a data stream, the apparatus comprising:

receiving means for receiving the data stream, wherein the video data in the data stream includes a plurality of frames;

processing means for processing frames from the plurality of frames;

first determination means for determining a number of frames processed;

second determination means for determining a number of frames dropped during processing; identification means for identifying a synchronization speed using the number of frames processed and the number of frames dropped;

dropping means for selectively dropping a frame in the data stream based on the synchronization speed; and wherein the plurality of video frames includes I frames, B frames, and P frames and wherein the dropping means drops all frames for a selected portion of the data stream.

34. An apparatus for processing video data in a data stream, the apparatus comprising:

receiving means for receiving the data stream, wherein the video data in the data stream includes a plurality of frames;

processing means for processing frames from the plurality of frames;

first determination means for determining a number of frames processed;

second determination means for determining a number of frames dropped during processing; identification means for identifying a synchronization speed using the number of frames processed and the number of frames dropped;

dropping means for selectively dropping a frame in the data stream based on the synchronization speed; and wherein the plurality of frames includes I frames, B frames, and P frames and wherein the dropping means drops only B frames and P frames within a selected portion of the data stream.

35. An apparatus for processing video data in a data stream, the apparatus comprising:

receiving means for receiving the data stream, wherein the video data in the data stream includes a plurality of frames;

processing means for processing frames from the plurality of frames;

first determination means for determining a number of frames processed;

second determination means for determining a number of frames dropped during processing; identification means for identifying a synchronization speed using the number of frames processed and the number of frames dropped;

dropping means for selectively dropping a frame in the data stream based on the synchronization speed; and wherein the plurality of frames includes I frames, B frames, and P frames and wherein the dropping means drops only B frames within a selected portion of the data stream.

36. The apparatus of claim 31, wherein the dropping means further includes dropping frames based on a presence of audio data.

37. The apparatus of claim 31, wherein the apparatus is a data processing system.

38. The apparatus of claim 31, wherein the apparatus is an audio/visual adapter.

39. A computer program product for use in a data processing stream for processing video data in a data steam, the computer program product comprising:

a computer usable medium;

first instructions for receiving the data stream, wherein the video data includes a plurality of frames;

second instructions for processing frames from the plurality of frames;

third instructions for determining a number of frames processed;

fourth instructions for determining a number of frames dropped during processing;

fifth instructions for identifying a synchronization speed using the number of frames processed and the number of frames dropped; and sixth instructions for selectively dropping a frame in the data processing system based on the synchronization speed, wherein the instructions are embodied within the computer usable medium.

* * * * *

UNITED STATES PATENT AND TRADEMARK OFFICE
CERTIFICATE OF CORRECTION

PATENT NO. : 6,803,964 B1
DATED : October 12, 2004
INVENTOR(S) : Post et al.

It is certified that error appears in the above-identified patent and that said Letters Patent is hereby corrected as shown below:

Column 8,
Line 34, after "delayed" delete "dropped" and insert -- drop --.
Lines 35 and 36, before "flag" delete "dropped" and insert -- drop --.
Line 38, after "delayed" delete "dropped" and insert -- drop --.

Column 10,
Lines 48 and 64, after "plurality of" delete "fame" and insert -- frame --.

Column 11,
Line 28, before "in which" delete "type" and insert -- types --.
Line 35, after "of frame" delete "type," and insert -- types --.

Column 14,
Line 55, after "plurality of" delete "Same" and insert -- frame --.

Column 15,
Line 2, after "each" delete "if".
Line 11, before the first occurrence of "frames" insert -- I --.

Signed and Sealed this

Twenty-fourth Day of January, 2006

JON W. DUDAS
*Director of the United States Patent and Trademark Office*